United States Patent
Pieper et al.

(10) Patent No.: US 11,336,704 B1
(45) Date of Patent: May 17, 2022

(54) APPARATUS AND METHOD FOR SIMULTANEOUS MULTI-USER SCREEN AND WINDOW SHARING, CAPTURING AND COORDINATION TO FORM A COLLABORATION RECORDING

(71) Applicant: CoScreen, Inc., Menlo Park, CA (US)

(72) Inventors: Till Pieper, Menlo Park, CA (US); Max Andaker, Menlo Park, CA (US); Jason Thomas, Menlo Park, CA (US)

(73) Assignee: Datadog, Inc., New York, NY (US)

(*) Notice: Subject to any disclaimer, the term of this patent is extended or adjusted under 35 U.S.C. 154(b) by 0 days.

(21) Appl. No.: 17/236,608

(22) Filed: Apr. 21, 2021

Related U.S. Application Data

(63) Continuation-in-part of application No. 17/101,397, filed on Nov. 23, 2020, now Pat. No. 11,150,861.

(60) Provisional application No. 63/044,049, filed on Jun. 25, 2020.

(51) Int. Cl.
  *G06F 3/048* (2013.01)
  *H04L 65/401* (2022.01)
(52) U.S. Cl.
  CPC .............. *H04L 65/4015* (2013.01)
(58) Field of Classification Search
  CPC ...... G06F 3/1454; G06F 3/0481; G06F 9/452; G06F 3/048; H04L 65/0415
  See application file for complete search history.

(56) References Cited

U.S. PATENT DOCUMENTS

| | | | | |
|---|---|---|---|---|
| 2011/0138116 A1* | 6/2011 | Lipinski | ............... | G06F 3/0674 711/103 |
| 2011/0307783 A1* | 12/2011 | Robert | ............... | G06F 3/04842 715/716 |
| 2015/0128174 A1* | 5/2015 | Rango | ............. | H04N 21/21805 725/34 |
| 2015/0142800 A1* | 5/2015 | Thapliyal | ............. | G06F 16/345 707/737 |
| 2015/0365454 A1* | 12/2015 | Chao | ................... | H04L 67/1074 709/219 |
| 2015/0378577 A1* | 12/2015 | Lum | ...................... | G06F 3/048 715/720 |
| 2017/0024100 A1* | 1/2017 | Pieper | .................... | H04L 65/80 |
| 2020/0312348 A1* | 10/2020 | Shao | ...................... | G10L 21/10 |

* cited by examiner

*Primary Examiner* — Jeanette J Parker
(74) *Attorney, Agent, or Firm* — Cooley LLP

(57) ABSTRACT

A non-transitory computer readable storage medium has instructions executed by a processor to host a composite window collection for a group of collaborators. The composite window collection includes individual windows controlled by individual collaborators and the group of collaborators observe the composite window collection from different computers connected via a network. A composite window collection session recording is formed. The composite window collection session recording is augmented with metadata to form a collaboration recording. Storage rules are applied to the collaboration recording. A request for the collaboration recording is received from a user. The user is prompted for metadata filtering criteria. A filtered collaboration recording is constructed in accordance with the metadata filtering criteria. The filtered collaboration recording is supplied to the user.

11 Claims, 10 Drawing Sheets

APPARATUS AND METHOD FOR SIMULTANEOUS MULTI-USER SCREEN AND WINDOW SHARING, CAPTURING AND COORDINATION TO FORM A COLLABORATION RECORDING

CROSS-REFERENCE TO RELATED APPLICATION

This application claims priority to U.S. Provisional Patent Application Ser. No. 63/044,049, filed Jun. 25, 2020, the contents of which are incorporated herein by reference; this application is also a continuation-in-part of U.S. Ser. No. 17/101,397, filed Nov. 23, 2020.

FIELD OF THE INVENTION

This invention relates generally to computer network communications. More particularly, this invention is directed toward techniques for simultaneous multi-user screen and window sharing, capturing and coordination.

BACKGROUND OF THE INVENTION

As remote work grows in popularity, there is a need for improved computer network communications between collaborating workers. Computer network communications between collaborating workers is complicated by different capabilities of different user devices, such as different operating systems, video resolutions and network connection speeds.

Thus, there is a need for improved computer network communications for collaborating workers.

SUMMARY OF THE INVENTION

A non-transitory computer readable storage medium has instructions executed by a processor to host a composite window collection for a group of collaborators. The composite window collection includes individual windows controlled by individual collaborators and the group of collaborators observe the composite window collection from different computers connected via a network. A composite window collection session recording is formed. The composite window collection session recording is augmented with metadata to form a collaboration recording. Storage rules are applied to the collaboration recording. A request for the collaboration recording is received from a user. The user is prompted for metadata filtering criteria. A filtered collaboration recording is constructed in accordance with the metadata filtering criteria. The filtered collaboration recording is supplied to the user.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
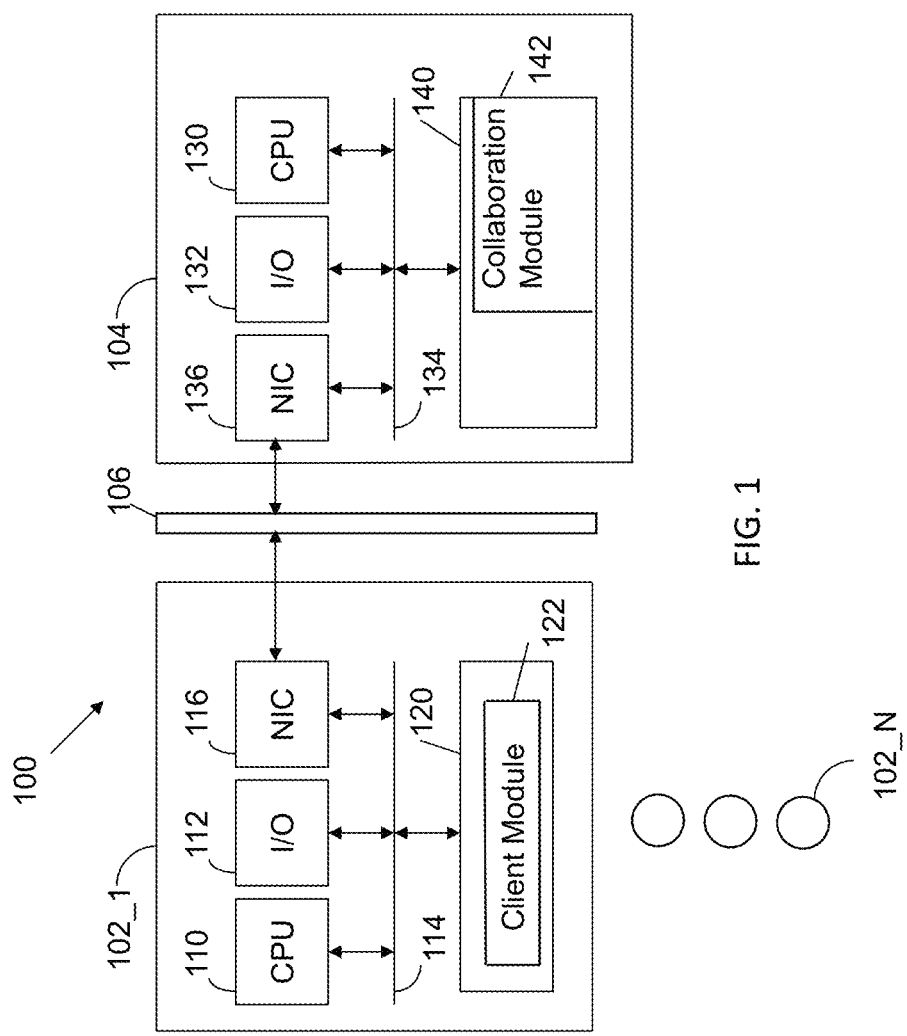
FIG. 1 illustrates a system configured in accordance with an embodiment of the invention.

FIG. 1 illustrates a system 100 configured in accordance with an embodiment of the invention. The system 100 includes a set of client devices 102_1 through 102_N, which may be sending or receiving devices. Each client device 102_1 through 102_N is connected to a network 106, which may be any combination of wired and wireless networks. A collaboration server 104 is also connected to network 106.

Client device 102_1 includes a processor (e.g., a central processing unit or CPU) 110 and input/output devices 112 connected via a bus 114. The input/output devices 112 may include a keyboard, mouse, touch display and the like. A network interface circuit 116 is also connected to the bus 114 to provide connectivity with network 106. A memory 120 is also connected to the bus 114. The memory 120 stores a client module 122 with instructions executed by processor 110 to implement operations disclosed herein. Client device 102_1 may be a desktop computer, laptop computer, tablet, smartphone and the like.

Collaboration server 104 includes a processor 130, input/output devices 132, a bus 134 and a network interface circuit 136. A memory 140 is connection to bus 134. The memory 140 stores a collaboration module 142 with instructions executed by processor 130 to implement operations disclosed herein.

The collaboration module 142 facilitates remote control and simultaneous sharing of multiple application windows by multiple users operating client devices 102_1 through 102_N. The multiple users are collaborators that share a composite window collection.

Figure 2:
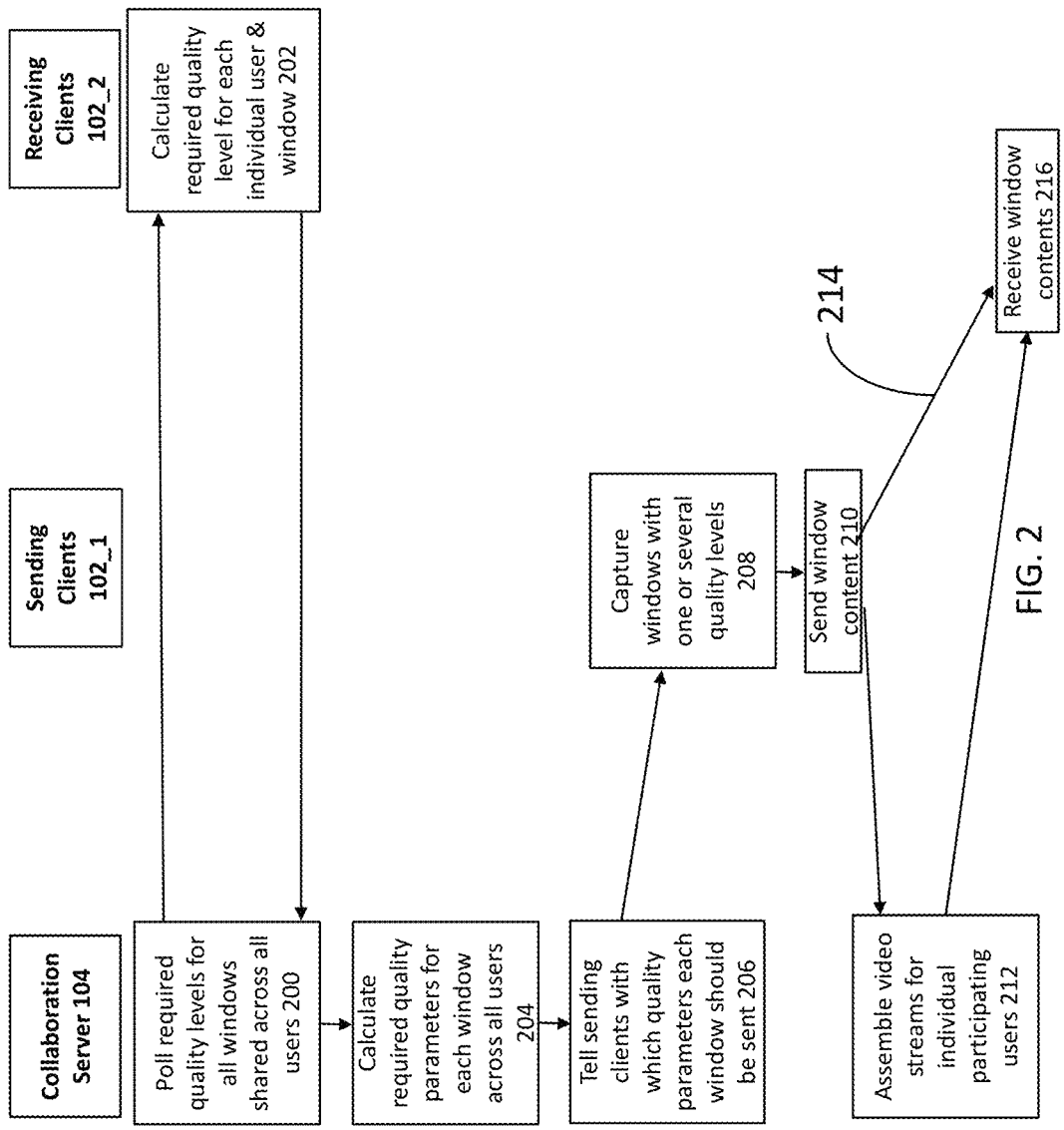
FIG. 2 illustrates communications between a collaboration server, sending clients and receiving clients in accordance with an embodiment of the invention.

FIG. 2 illustrates interactions between collaboration server 104, a sending client 102_1 and a receiving client 102_2. Initially, the collaboration server polls the client devices for the required quality levels of all windows shared across all users 200. The users are collaborators that selectively submit windows from client devices to a composite window collection that appears on at least on client device associated with the group of collaborators.

Receiving clients 102_2 calculate required window quality information for each individual user and window 202 and pass this information to the collaboration server 104. The information may include window metadata.

Required quality level information requested by the collaboration server 104 includes end user device attributes for each collaborator, such as maximum bandwidth a client can handle in terms of receiving, managing and sending video streams, preferred bandwidth a client can handle in terms of receiving, managing and sending video streams, maximum CPU and memory resources a client can allocate in terms of receiving, managing and sending video streams, preferred CPU and memory resources a client can handle in terms of receiving, managing and sending video streams and display resolution.

Window metadata received by the collaboration server 104 may include Title (e.g. application name, file name), Content (=text, images, video, etc.), Type (regular window, full-screen, popup, tooltip, etc.), Appearance (with/without borders, theme, with/without/toolbars, etc.), Underlying technology (Java, C++, Objective C, Swift, C#, Electron, etc.), User Interface Elements and accessibility information (input fields, text labels, buttons, interactive elements, etc.), Interactivity (can a user interact with it or is it read-only/blocked for entry), Sequence in a stacked collection of windows, referred to as a Z-Index, Size, Position (on which display does it appear and at which coordinates), Relationships (e.g., by which user or also other application window was it opened, which other windows has it opened, which windows have to close once this window is closed), Edit state (e.g., are there unsaved changes), Which user interacts with it (e.g., mouse hovers, clicks, or types), Which user looks at it (e.g., via gaze tracking), Which user could technically see it (because it's in her foreground), and which sound and audio signals the window emits.

Collaboration server 104 calculates required quality parameters for each window across all users 204. The collaboration server 104 then instructs sending clients about quality parameters each window should have 206. Example instructions may specify: (1) "@User C: send window X in resolution 540×400 pixels using codec AV1 with quality level 47 to User A, in 1080×800 pixels using codec H264 with quality setting 2 to User B", (2) "@User A: send window Y with a frame rate of 15 FPS to all other users" and (3) "@User B: suspend sending window Z as no user is looking at it right now".

The sending client 102_1 captures the window instructions 208 and then sends window content 210. The content may be sent to the collaboration server 104, which assembles video streams for individual participating users 212. Alternatively, as shown with arrow 214, the content may be sent using a peer-to-peer mechanism. The receiving clients 102_2 receive the window content 216.

Consider the following scenario. User A, B, C, and D connect. User A, B, C have a high bandwidth, user D has a low bandwidth. User A shares a window but User B and C have other windows in the foreground so would not be able to see it. Only user D would see it because he does not have any other windows open. Therefore, the server determines that the window by User A is shared in a low quality/resolution and using a special low-bandwidth codec to accommodate. The server could determine to send an additional high resolution stream (e.g. via Simulcast) once User B pulls User A's window in the foreground to make sure she sees it in a high quality.

Figure 3:
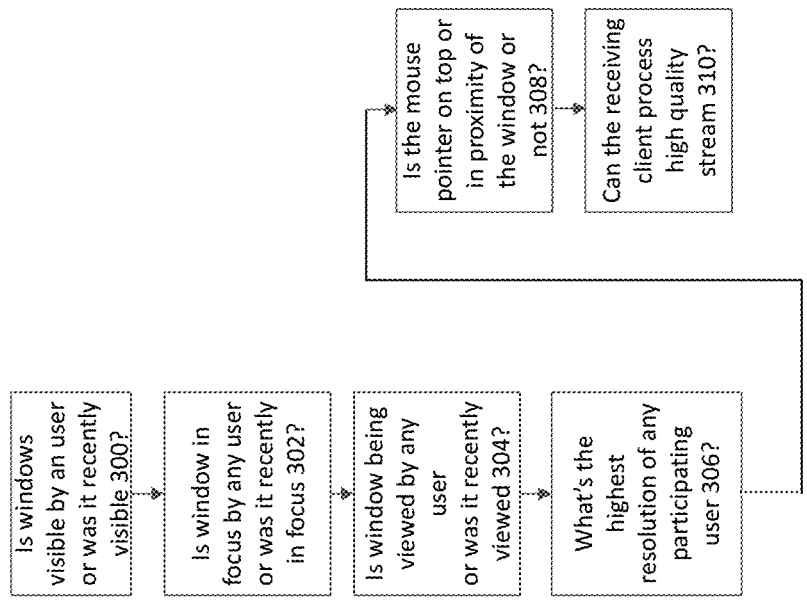
FIG. 3 illustrates configuring quality levels for shared windows in accordance with an embodiment of the invention.

FIG. 3 illustrates a sequence of operations to determine and configure quality levels for shared windows. More particularly, FIG. 3 illustrates the gathering of window visibility criteria for the composite window collection. A first consideration is whether the window is visible for a user or was it recently visible 300? The system could calculate this based on the currently displayed windows and how they are stacked on top of each other. For example, it may be determined that a given window that is about to be shared would not even be visible to the receiving user because it would be obstructed by another window. The user might also be moving a window across the screen. While that is happening the client could predict that a shared window that was previously obstructed will soon be visible and therefore has to be displayed. A user could also manually deactivate seeing windows that were shared with him. If that was done, the windows would not be visible (and therefore would not have to be shared with that user). If a window is visible the quality level can be increased. If a window is not visible, the quality level can decrease.

The next window visibility consideration in FIG. 3 is whether the window is in focus by any user or was it recently in focus 302? Operating systems track which window is in focus for a user—which often means that it looks slightly different to indicate to the user that she can type into the window. In most operating systems only one window can be in focus at a time so it is fairly easy to retrieve. If a window is in focus, the quality level can be increased. If the window is not in focus, the quality level can be decreased.

It can also be determined if the window is being viewed by any user or if it was recently viewed 304? This could be determined by gaze tracking (see below) or also by the fact that a user sits in front of a computer (e.g., by analyzing the webcam picture), moves the mouse over a window or even actively types into it. If the window is being viewed, the quality level can be increased. If the window is not being viewed, the quality level can be decreased.

One can also evaluate which user has the highest resolution of any participating user 306? Resolutions may then be balanced in accordance with pre-determined minimum resolution standards per user.

One can also consider whether the mouse pointer is on top or in proximity of the window or not 308? This could be done simply by comparing X/Y coordinates of the mouse pointers and the position of windows. If the mouse point is proximate to the window, window resolution may be increased; otherwise it may be decreased.

Finally, one can assess whether the receiving client processes high quality streams 310? This may be based on bandwidth, CPU and memory resources.

Figure 4:
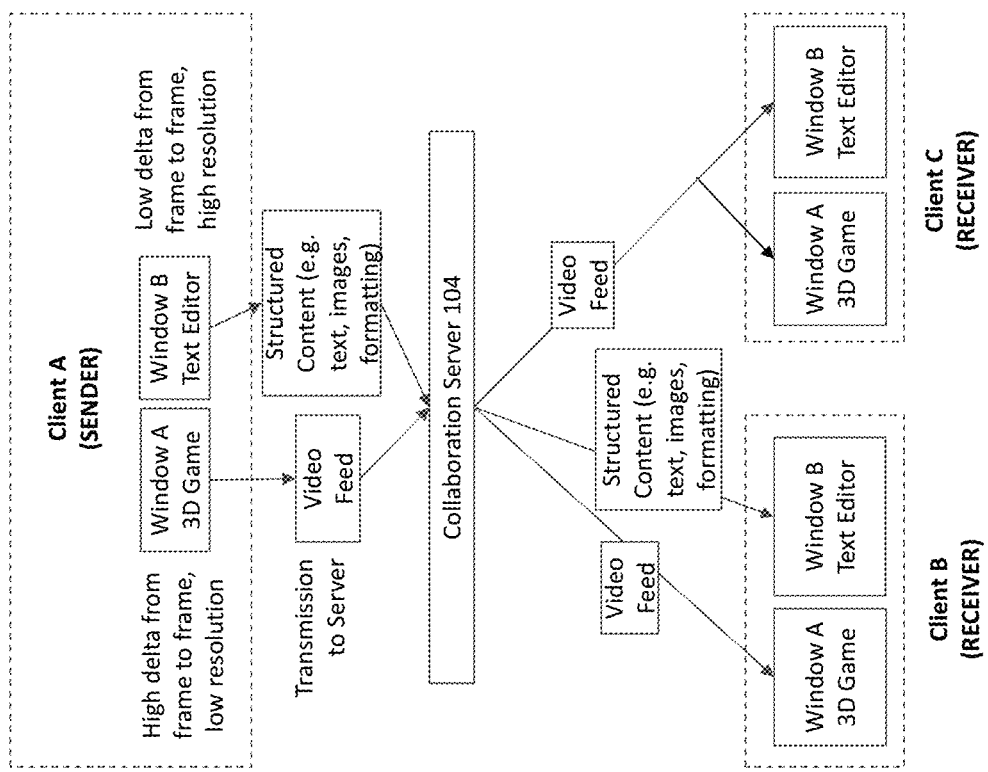
FIG. 4 illustrates different approaches for sharing individual windows in accordance with an embodiment of the invention.

FIG. 4 illustrates sharing individual windows with individual users using different approaches. Client A, a sender, shares Window A with a 3D game and Window B with a text editor. The windows are transmitted to the server in different ways due to their unique properties. In particular, Window A is sent as a video feed to collaboration server 104 and Window B is sent as structured content to the collaboration server 104.

The collaboration server 104 converts the streams if necessary and sends the information to each participating client in the most appropriate way for each particular client. In this case, Client C might receive the stream of Window B as a video feed because its network might be overloaded so that it would be more beneficial to send the information as one joint video stream, which might then be disassembled again by Client C upon reception. That is, client C receives one video stream—here the two shared windows, e.g. appearing side-by-side, in a combined image/feed. It would also receive related metadata like window positions, sizes, and audio signals and would use that information to cut out window A and B into two separate image feeds/video streams which would then be projected into window A and B on client C to appear as distinct windows. Audio of a shared window can be played if the window is in focus by the receiving user.

Client B may receive a video feed for the 3D game and separate structured content for the text editor.

The content delivery strategy may be informed by a consideration whether the content would be in focus by a local or remote user (so the remote client would need to send this information so that the capturing client could react accordingly). Another consideration is if they could be fully or partially seen by a local or remote user (so the remote client would need to send this information so that the capturing client could react accordingly). Another consideration is if a remote user's mouse pointer or finger would be in proximity, moving towards or on top of the window. Another consideration is if they would be watched by a remote user (e.g., sensed via eye/gaze tracking). Another consideration is if they would be picked by a user to be shared by clicking on a button that would be displayed above or attached to each window. Another consideration is what type of content they would display (e.g., static high resolution content or a low resolution video or a video game with a high frame rate). The forgoing considerations enable reduced CPU usage on the client side as well as an optimization of bandwidth resources towards content that is most relevant to the participating users.

Windows could also be captured from the local user's desktop into one joint full-screen video stream with a transparent background, without the user's desktop background and without windows that are not intended to be shared. The desktops are then scaled and overlaid on each other in the same area.

Transparent click through would be used if overlaid on a remote end's desktop, to allow them to interact with their own local windows in the same space. A Z-Index could be kept for each individual desktop, and when a window on that desktop is clicked, all of the windows for that layer are brought to the front.

Figure 5:
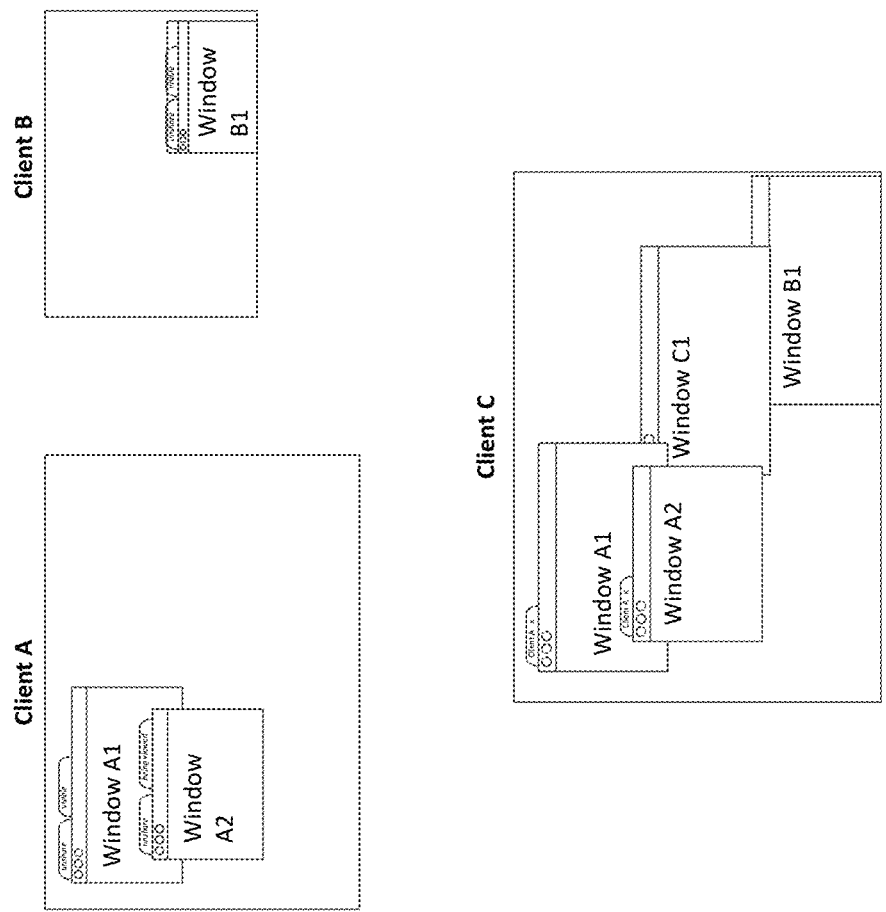
FIG. 5 illustrates multi-window sharing in accordance with an embodiment of the invention.

FIG. 5 illustrates a scenario where the collaboration server takes Window A1 and Window A2 from Client A and Window B1 from client B and presents them in a composite manner on Client C. Client C also displays a resident local Window C1. Thus, in this scenario, two users (Client A and Client B) can share their windows at the same time with Client C, which has a composite window collection from Client A, Client B and Client C.

The background of each desktop of each user might not be shared. The shared window contents are dynamically adjusted to the particular screen layouts and sizes. Users can decide which window they want to share. Users can see from which client a remote window was shared. Users get an indication which shared windows are visible and which are currently viewed by another user. Remote windows could be projected as native windows on a desktop or also as UI elements into a custom application or a website which might run in a browser. Users could decide on a by-window basis what they want to share. Users could see which user a remote window was shared by.

The result shown in FIG. 5 can be based upon a Per Window Stream method where windows are individually captured and sent as one stream per window to the remote end. Their current state could be monitored, to determine if they are obscured by another window, and only the portion of their image that would be visible to remote users is transmitted, or the stream is entirely paused in this scenario. The streams could then be recomposited, scaled, and placed together in varying positions, either related to the source desktop position, or in a completely different configuration.

Those streams could either then be composited into a single native window, the interaction events mirrored to the window on the other side, or could be composited into a single transparent overlay, using the same interaction mirroring and transparent clickthrough method as the single stream approach.

Windows can be presented as individual HTML elements in a browser-based client. Users can interact with these HTML elements (e.g., move, resize, maximize, minimize, zoom, scroll, etc.) and the interactions are applied on the native side to the actual native shared windows. Remote interactions feel much more natural and different users could focus on different elements at the same time because the HTML elements are rendered separately instead of all as part of one sole video element, as is the case with existing solutions.

Figure 6:
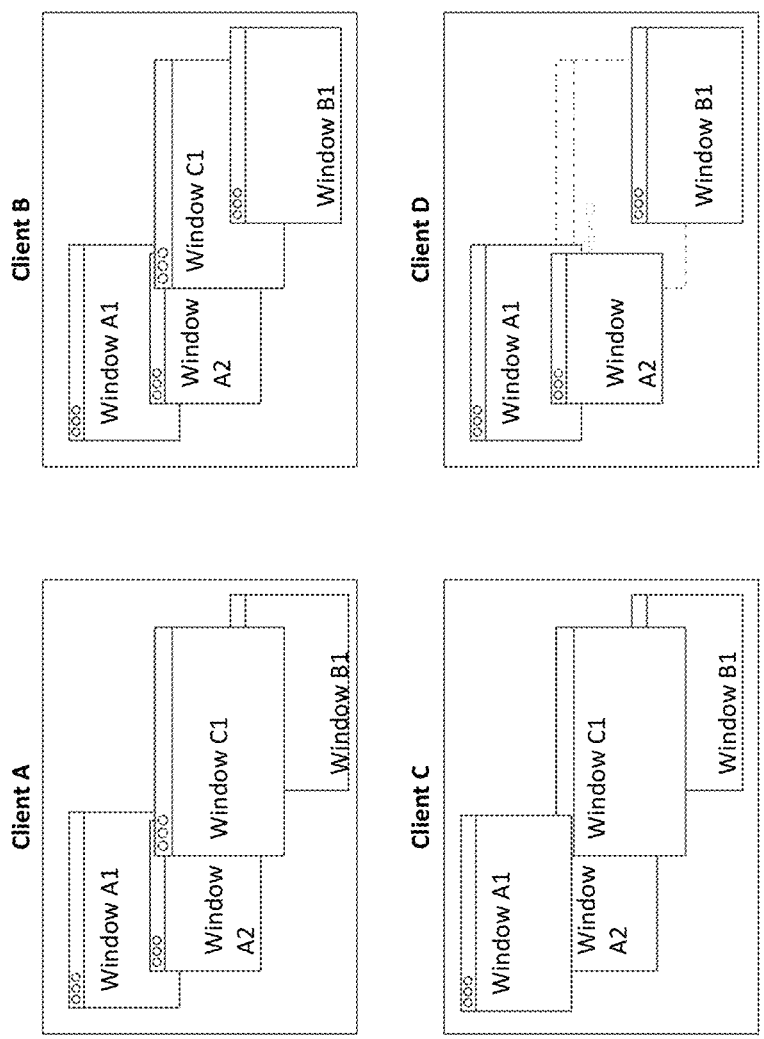
FIG. 6 illustrates all-to-all window sharing in accordance with an embodiment of the invention.

FIG. 6 illustrates an all-to-all composite window collection sharing scenario. Client A has local Window A1 and local Window A2, plus remote Window B1 from client B and remote Window C1 from client C. Client B has local Window B1, plus remote Window A1 and Window A2 from client A and remote Window C1 from client C. Client C has local Window C1, plus remote Window A1 and Window A2 from Client A, and remote Window B1 from client B. Client D has remote Window A1 and Window A2 from Client A, and remote Window B1 from client B.

Thus, multiple users can share windows with each other at the same time. Each user can focus on a different window, whether their own or by another user. Each user can decide to hide or show any window of another user (here: Client D has decided to hide Window C1 by Client C (shown with dashed lines) so it is not actually visible).

Client A grabs the image/application information from the two windows and sends them to Client C (either as one joint stream as discussed above or as individual streams per window). Client C receives the video/window streams, creates empty native application windows and projects the content into it. That way Client C makes the windows from Client A appear as if they were local.

Not only could the sequence of windows be de-synched (i.e., windows could have a different sequence/Z-index for each other), but also each window position can be altered so that users could move the same windows into different spots on their desktops. Due to the fact that users can see the same windows but in different places and sequences, also mouse pointers might only be displayed when hovering over a certain window or a certain display area and they might also be shown in a user-specific sequence (e.g., User A's window might hide User B's mouse pointer which is hovering behind it over User C's window).

Because the described solution can share and recreate individual windows across multiple users, it also enables users to decide to hide individual shared windows. Each user can decide for themselves which windows are shared. Multiple users can type and click into different windows at the same time. The central collaboration server 104 coordinates the control signals so that they are only sent to the relevant clients, which might interact via a peer-to-peer (P2P) connection and therefore negotiate the control flow directly between them. Clients that receive control signals might inject the controls at system level or also into particular windows, depending on the attributes of the shared application or the overall operating system.

Users who remote control one window should not affect users negatively who interact with another window (e.g., steal their typing cursor or change their window sequence). Users should be able to type or click into or interact with different windows by the same or different users at the same time. Example: Alice should be able to type into Bob's window A while Bob types into Bob's window B, or also Alice's window C. The system would have to inject Alice's commands into Bob's window without making his cursor or focus change to that window, thereby changing the typical behavior of single user operating systems like Apple macOS®, Microsoft Windows®, Linux®, Apple iOS®, and Android®. It would work differently from typical remote desktop and remote collaboration solutions that apply remote controls at system level.

Users should be able to see windows in a different sequence by the same or different users at the same time. For example, Alice should be able to look at her window C which obstructs Bob's window B for her, but Bob could look at it while this obstructs Alice's window C for him. Users should be able to copy & paste content from a window from one user into a window of another user. For example, Alice could copy text from Bob's window A into Chris' window C. The system would have to determine and coordinate when the copy interaction would be executed, into which clipboard the text should be copied and when it would be pasted from which clipboard it should be pasted. Users could even drag & drop content from a window from one user into a window of another user. For example, Alice could drag a file from Bob's macOS Finder® window into Chris' Windows Explorer® window. The file would be directly copied from Bob to Chris, potentially routed through the collaboration server 104. The system would also coordinate which remote mouse pointer should be visible to which user, in addition to their positioning and the injection of remote input based on their position.

Figure 7:
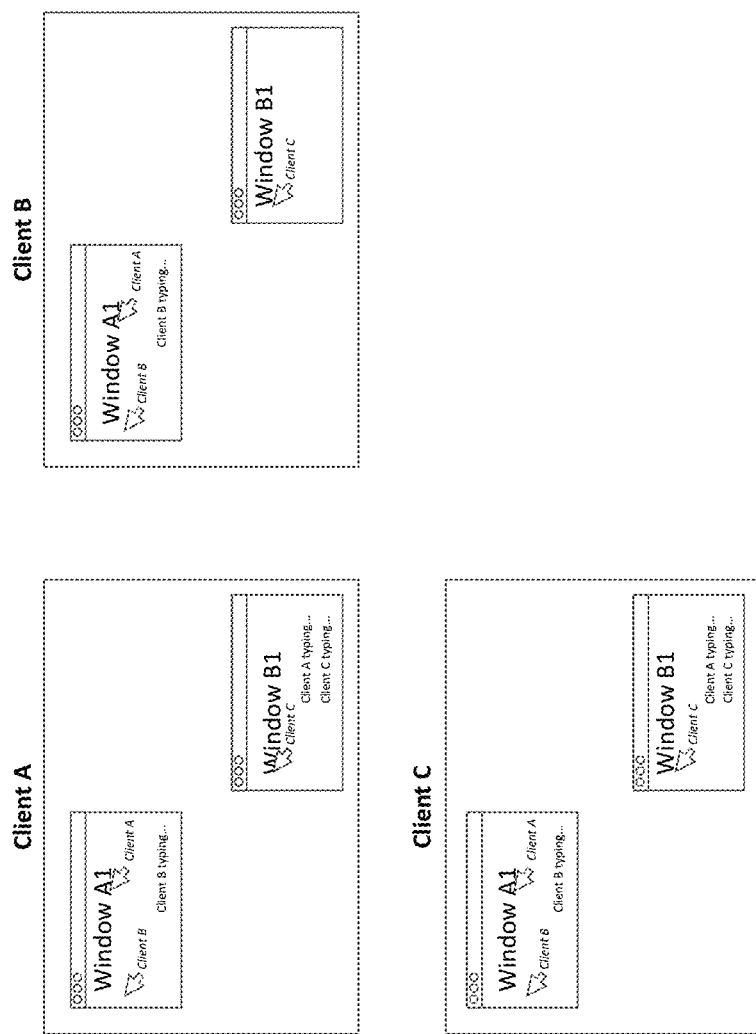
FIG. 7 illustrates multi-user window sharing with remote control input in accordance with an embodiment of the invention.

FIG. 7 illustrates Client A displaying local Window A1 and remote Window B1 from Client B. Each Window includes indicia of current user activity, such as who is typing in a Window at any given time. In the case of Client A, Window A1 indicates that "Client B is typing" and Window B1 indicates that "Client A is typing and Client C is typing". Client B and Client C have similar attributes.

It should be appreciated that some clients might support focusing on/applying input into several windows at once, others only into one window at a time. Some clients might run on macOS®, others on Windows®, Linux®, mobile operating systems or as web clients. Clients might have different resolutions and screen layouts. Clients might also differ in terms of interaction modalities—some might support mouse and keyboard, others only touch interaction. The system would need to convert input accordingly (e.g., touch interaction into a mouse click) depending on which modality the receiving client supports.

Operating systems might also have different commands for the same interaction. For example, in Microsoft Windows® you can copy content to the clipboard by pressing CTRL+C, in Apple macOS® it is done via Command+C. Or screenshots are taken via PrtScn in Microsoft Windows® but using Shift+Command+3. The collaboration server 104 has to convert the input so that users can control remote clients with commands they are familiar with and apply them on the receiving end in the locally applicable way. The clients might interact via a peer-to-peer (P2P) connection and therefore negotiate the control flow directly between them.

Figure 8:
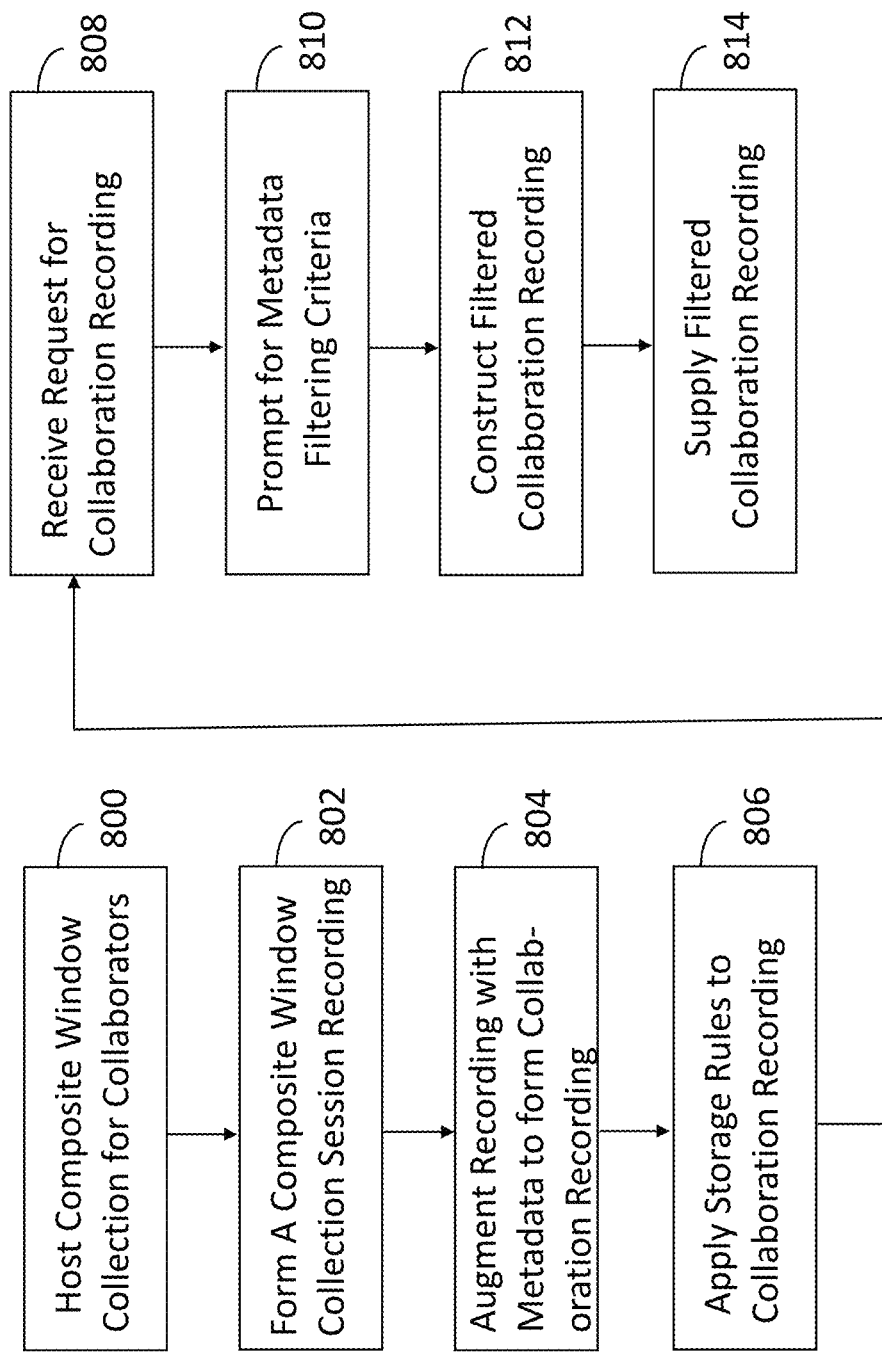
FIG. 8 illustrates collaboration recording processing operations performed in accordance with an embodiment of the invention.
Figure 9:
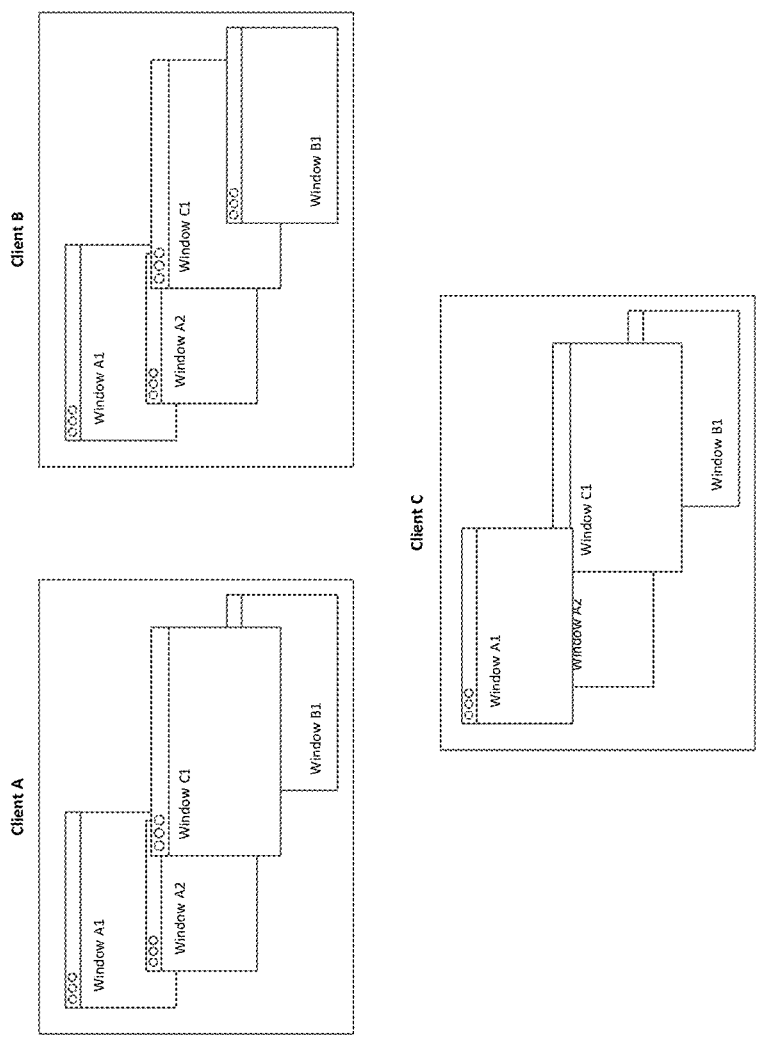
FIG. 9 illustrates a multi-user window sharing session recorded in accordance with an embodiment of the invention.

In one embodiment, the collaboration module 142 includes instructions executed by processor 130 to implement the operations of FIG. 8. A composite window collection for collaborators is hosted 800. FIGS. 5-7 illustrates examples of different composite window collections. FIG. 9 provides another example. Client A controls Window A1 and Window A2, but also sees a Window B1 controlled by Client B and a Window C1 controlled by Client C. Client B and Client C show the same windows, but they are in different configurations at the discretion of each user. That is, each user is free to arrange the composite window collection in a manner deemed appropriate to the user.

A composite window collection session recording is formed 802. That is, the collaboration module 142 records all interactions that the collaborators have with the composite window collection.

The recording is augmented with metadata to form a collaboration recording 804. For example, the metadata may include metadata for each window in the composite window collection (e.g., window size, location, resolution, relation to other windows, etc.). The metadata may include metadata for each collaborator in the group of collaborators (e.g., user name, user position, user system permissions, etc.). The metadata may include metadata for each user interaction with a window (e.g., re-sizing of a window, typing in a window, etc.). The metadata may include metadata for each communication exchange between the group of collaborators (e.g., chat exchanges between users). The metadata may include time stamps (e.g., time stamps assigned sequentially to individual video frames). The metadata may include event bookmarks (e.g., a user leading a discussion, a user presenting a new screen, etc.).

Storage rules are applied to the collaboration recording 806. The storage rules may be time based (e.g., store the collaboration recording for three days). The storage rules may be event based (e.g., store the collaboration recording until memory is three-quarters full). The storage rules may be user based (e.g., store collaboration recording for one day for Clients A and B, but for three days for Client C).

A request for a collaboration recording is received 808. For example, Client A using client device 102_1 requests the collaboration recording from collaboration module 142. The user is prompted for metadata filtering criteria 810. The information received from the prompts is used to construct a filtered collaboration recording. Thus, any of the previously referenced metadata may be used as a filter to limit the amount of information delivered to the user. In this way, the user receives the information that is most important to the user. For example, the user may only be interested in typed words exchanged between users during a collaboration session. Thus, metadata on communication exchanges may be used to retrieve this information. Similarly, the metadata may be used to reopen a collaboration session based upon specific layouts, positions, sizes, settings and contexts across multiple clients.

Figure 10:
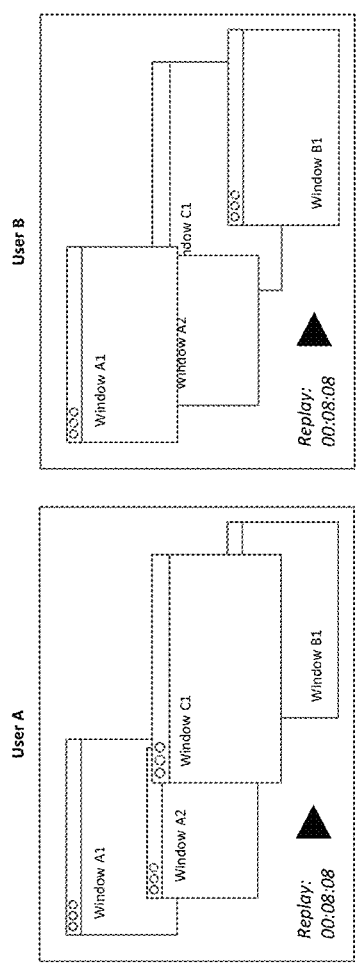
FIG. 10 illustrates filtered collaboration recording playback performed in accordance with an embodiment of the invention.

The filtered collaboration recording is supplied to the user 814. FIG. 10 illustrates filtered collaboration recording playback. User A receives a playback session reconstructing User A's experience in the collaboration session, while User B receives a playback session reconstructing User B's experience in the collaboration session.

Thus, it can be appreciated that whenever a user types into a shared window/object (e.g., shared via drag and drop), the input is captured (e.g., pressed keys, mouse clicks, text and metadata of clicked buttons and UI elements), as well as window/object content (as video or as web content) along with relevant metadata (e.g., name of user remote controlling, timestamp, other participating users, application name, link if a website, potentially even played or spoken audio). For example, Alice might share a browser window showing an cloud service admin dashboard with her colleague Bob. Bob sees that dashboard and interacts with it using mouse and keyboard to complete the setup of a server. The solution could capture each individual keypress and positions and type of each mouse clicks and the timestamps when they were applied so they can be overlaid over the recording of the video stream of the shared window. That way it can be replayed later, e.g. to audit which user actually clicked a button to start a particular server or changed the hardware sizing of it.

As previously indicated, users can manually decide to capture and bookmark relevant parts of a collaboration session. They could even do so retroactively when a blackbox-like automated recording system could be established that continuously records collaboration sessions together with their context. That way a user could decide to store, e.g., the last 1, 5, or 15 minutes after the fact and annotate them so they could easily retrieve them later. All other recordings would be discarded automatically.

Stored content could be automatically transcribed using speech-to-text translation, cut into segments, summarized, annotated with speakers and other context. Textual content that was stored retroactively could be shared as snippets or entirely with participants and others. For examples, the textual content may be filtered in accordance with metadata criteria.

The disclosed advanced collaboration solution enables multiple users to share content simultaneously. For example, it enables three users to share application windows simultaneously. All three users would see these application windows by default on the same combined team desktop in the same relative location. But each user could decide to focus on a different window or to put a different window into the foreground.

When recording such collaboration sessions, a simple approach like full desktop recording of one user's screen would not be sufficient. The recording would show windows that might not actually have been shared by the local users, which were therefore hidden from remote users. A user might have also put another user's full-screen window into the foreground, hiding all other windows in the background which might have been used in the foreground by the other participants at the same time.

This system therefore records collaboration sessions in a smart way based on individual feeds and metadata. Users that replay sessions that were recorded that way could take the viewpoint of any participant and even switch focus between objects that were shared in that session.

The system might also record which user has looked at (e.g., via gaze tracking) or was able to see (based on the user's window sequence and layout) specific windows as another part of an auditing trail.

When replaying or restoring past collaboration sessions, the system could not only replay static video feeds of what was shared on a by-user basis, but also reopen applications or documents including specific layouts, positions, sizes, settings and context across multiple clients. It can also automatically invite relevant users based on past patterns and sessions.

Users can create templates for collaboration sessions which would, e.g., show a Clubhouse® project board in a Chrome® window in the top left. quadrant of a screen, the latest GitHub® commit in a Safari® window on the right half of the screen and automatically invite Mary, Jason and Robert.

External workflows could also automatically trigger the creation of a templatized collaboration session, e.g., a code merge request in GitLab®, the creation of an opportunity in Salesforce® or a ticket in ServiceNow®, and interact with it.

Embodiments of the invention capture extensive metadata of collaboration sessions beyond just video/audio content. This metadata may include typed keys/words/shortcut, e.g., "A", "b", "[CTRL+ALT+DEL]", "delete", clicks/touch interactions, e.g., "left click at coordinates X 88px/Y 2307px", application metadata, e.g., "The URL of the opened window was https://lively-web.org/, time/user/collaboration metadata, e.g., "alice01 entered input at 11/11/2015, bob03 and chris04 focused also on the window at the same time.

Those skilled in the art will appreciate the interactivity of the disclosed recording. Typically, collaboration sessions (e.g., Zoom® calls) are recorded as video streams with audio. The disclosed technology enables users to interact with recordings by focusing on different shared windows and go much deeper by even seeing who interacted with which shared window in which way. It makes collaboration sessions fully auditable, much more than a static video recording ever could.

Users can leave comments on recordings or particular elements, e.g., windows that were shared during the recorded collaboration session, or even certain inputs, e.g., flag or comment on a shortcut that was captured that a remote user did to a shared window. Users might also be able to share a "deep" link to a specific element in a recording, e.g., to a key that was typed by a remote user into a shared window at a particular recording.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
   host a composite window collection for a group of collaborators, wherein the composite window collection includes individual windows controlled by individual collaborators and the group of collaborators observe the composite window collection from different computers connected via a network;
   form a composite window collection session recording;
   augment the composite window collection session recording with metadata to form a collaboration recording, wherein the metadata includes metadata for each communication exchange between the group of collaborators;
   apply storage rules to the collaboration recording;
   receive a request for the collaboration recording from a user;
   prompt the user for metadata filtering criteria;
   construct a filtered collaboration recording in accordance with the metadata filtering criteria; and
   supply the filtered collaboration recording to the user.

2. The non-transitory computer readable storage medium of claim 1 wherein the metadata includes metadata for each window in the composite window collection.

3. The non-transitory computer readable storage medium of claim 1 wherein the metadata includes metadata for each collaborator in the group of collaborators.

4. The non-transitory computer readable storage medium of claim 1 wherein the metadata includes metadata for each user interaction with a window.

5. The non-transitory computer readable storage medium of claim 1 wherein the metadata includes time stamps.

6. The non-transitory computer readable storage medium of claim 1 wherein the metadata includes event bookmarks.

7. The non-transitory computer readable storage medium of claim 1 wherein the storage rules are time based.

8. The non-transitory computer readable storage medium of claim 1 wherein the storage rules are event based.

9. The non-transitory computer readable storage medium of claim 1 wherein the storage rules are user based.

10. The non-transitory computer readable storage medium of claim 1 further comprising instructions executed by the processor to transcribe the collaboration recording to form a textual collaboration recording.

11. The non-transitory computer readable storage medium of claim 10 further comprising instructions executed by the processor to filter the textual collaboration recording in accordance with metadata criteria.

* * * * *